(12) United States Patent
Tanaka et al.

(10) Patent No.: US 11,239,664 B2
(45) Date of Patent: Feb. 1, 2022

(54) POWER CONVERSION SYSTEM

(71) Applicant: Mitsubishi Electric Corporation, Chiyoda-ku (JP)

(72) Inventors: Miwako Tanaka, Chiyoda-ku (JP); Toshiyuki Fujii, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/967,227

(22) PCT Filed: Jan. 24, 2019

(86) PCT No.: PCT/JP2019/002221
§ 371 (c)(1),
(2) Date: Aug. 4, 2020

(87) PCT Pub. No.: WO2019/198300
PCT Pub. Date: Oct. 17, 2019

(65) Prior Publication Data
US 2020/0395758 A1 Dec. 17, 2020

(30) Foreign Application Priority Data
Apr. 12, 2018 (JP) .............................. JP2018-076912

(51) Int. Cl.
*H02J 1/12* (2006.01)
*G06F 1/26* (2006.01)
(Continued)

(52) U.S. Cl.
CPC ................ *H02J 3/38* (2013.01); *H02J 1/002* (2020.01); *H02M 3/33576* (2013.01);
(Continued)

(58) Field of Classification Search
CPC .......... H02J 3/36; H02J 3/381; H02J 2300/28; H02J 1/002; H02J 3/38; H02M 7/06;
(Continued)

(56) References Cited

U.S. PATENT DOCUMENTS 9,825,485 B2 * 11/2017 Lee ......................... H02J 7/025
10,348,093 B2 * 7/2019 Suryanarayana ....... H02J 3/383
(Continued)

FOREIGN PATENT DOCUMENTS

EP 2 597 746 A1 5/2013
JP 5571163 B2 8/2014
(Continued)

OTHER PUBLICATIONS

U.S. Appl. No. 16/343,096, filed Apr. 18, 2019, US 2020/0052485 A1, Miwako Tanaka, et al.
(Continued)

*Primary Examiner* — Jared Fureman
*Assistant Examiner* — Esayas G Yeshaw
(74) *Attorney, Agent, or Firm* — Xsensus LLP

(57) ABSTRACT

An AC/DC converter and a DC/DC converter are disposed corresponding to a power generator. The AC/DC converter converts AC power generated by the power generator into a generated voltage, and outputs the generated voltage to a power line. The DC/DC converter converts the generated voltage on the power line into a collection voltage, and outputs the collection voltage to a collection line. DC power in a DC voltage grid formed of the collection line is transmitted through a DC/AC converter to an AC power grid. When a short-circuit fault occurs in the DC power grid or the AC power grid, a control command value for the AC/DC converter or the DC/DC converter is adjusted so as
(Continued)

to suppress incoming electric power flowing from the power generator in accordance with fluctuations of a collection voltage.

7 Claims, 10 Drawing Sheets

(51) Int. Cl.
    *H02J 3/36*     (2006.01)
    *H02J 3/38*     (2006.01)
    *H02J 1/00*     (2006.01)
    *H02M 3/335*     (2006.01)
    *H02M 7/06*     (2006.01)
    *H02M 7/48*     (2007.01)

(52) U.S. Cl.
    CPC ............... *H02M 7/06* (2013.01); *H02M 7/48* (2013.01); *H02J 2300/28* (2020.01)

(58) Field of Classification Search
    CPC ........ H02M 1/007; H02M 1/32; H02M 5/458; H02M 3/33584; H02M 7/48; H02M 3/33576; H02H 7/062; H02H 3/087; Y02E 60/60

See application file for complete search history.

(56) References Cited

U.S. PATENT DOCUMENTS

| | | | |
|---|---|---|---|
| 2010/0182809 A1* | 7/2010 | Cullinane | H02P 9/02 363/34 |
| 2012/0300510 A1 | 11/2012 | Jensen et al. | |
| 2013/0197704 A1* | 8/2013 | Pan | H02J 3/381 700/287 |
| 2013/0200714 A1* | 8/2013 | Pan | H02J 4/00 307/82 |
| 2017/0256984 A1* | 9/2017 | Ding | H02J 9/066 |
| 2018/0026562 A1* | 1/2018 | Hashimoto | H02J 3/36 290/40 B |
| 2019/0036343 A1* | 1/2019 | Nelson | H02J 3/18 |

FOREIGN PATENT DOCUMENTS

| | | |
|---|---|---|
| JP | 2016-1981 A | 1/2016 |
| WO | 2017/158891 A1 | 9/2017 |
| WO | 2018/135031 A1 | 7/2018 |

OTHER PUBLICATIONS

Extended European Search Report dated Jan. 19, 2021 in European Patent Application No. 19785119.9, 9 pages.
International Search Report dated Mar. 26, 2019 in PCT/JP2019/002221 filed on Jan. 24, 2019.

* cited by examiner

POWER CONVERSION SYSTEM

TECHNICAL FIELD

The present invention relates to a power conversion system, and more particularly to a power conversion system that transmits alternating-current (AC) power generated by a power generator through a direct-current (DC) power grid to an AC power grid.

BACKGROUND ART

A DC power transmission system is known in which high-voltage DC power is transmitted between bulk power conversion devices interconnected with direct current. DC power transmission is advantageous over AC power transmission in that the DC power transmission is free from current loss caused by the skin effect and thus has lower transmission loss in long-distance power transmission. Further, DC power transmission is also advantageous because it requires only two power lines, whereas AC power transmission using three-phase power requires three power lines. Particularly in recent years, DC power transmission, which is suitable for bulk power transmission, is increasingly employed with the spread of renewable energy such as photovoltaic power generation or wind power generation.

Japanese Patent Laying-Open No. 2016-1981 (PTL 1) discloses a configuration of a DC power transmission system in which AC power generated in a power generation facility such as a wind power generation facility is converted by an AC/DC converter into DC power, which is then output to a DC collection grid and further raised by a DC/DC converter to a prescribed DC voltage for implementing DC power transmission through a power transmission line (DC power transmission grid). Furthermore, the DC power after DC power transmission is converted by a DC/AC converter into AC power, and thereafter, lowered by a transformer to a prescribed voltage and then supplied to AC devices.

PTL 1 also discloses that the control mode is switched between a normal state and a fault state. Specifically, in the normal state, the DC/DC converter controls the voltage in the DC collection grid and the DC/AC converter controls the voltage in the DC power transmission grid. In contrast, at occurrence of an AC fault, the AC/DC converter controls the voltage in the DC collection grid and the DC/DC converter controls the voltage in the DC power transmission grid.

CITATION LIST

Patent Literature

PTL 1: Japanese Patent Laying-Open No. 2016-1981

SUMMARY OF INVENTION

Technical Problem

For reducing electric power generation while a grid voltage fluctuates due to a grid fault, there has been generally known a method of reducing the rotation speed of a windmill itself by pitch control and stall control of the windmill in a wind power generation facility. However, considerable delay time occurs from the time when the grid voltage fluctuations are detected to the time when a command is output to a control device on the windmill side. In addition to this, the windmill itself has a large inertia, which requires time to reduce the rotation speed of the windmill, thereby making it difficult to reduce electric power generation in a short time period.

Thus, also in the DC power transmission system in PTL 1, when reduction of electric power generation delays as described above in the wind power generation facility at occurrence of a temporary grid fault, the operation of the system is stopped due to overvoltage protection and the like, with the result that power supply may be stopped. In addition, not only in the wind power generation facility disclosed in PTL 1, but also in the system that transmits AC power generated using an energy source other than wind power to an AC power grid through a DC power grid, the incoming electric power from the power generation facility cannot be reduced in a short time period. This leads to a concern that a similar problem may occur.

The present invention has been made to solve the above-described problems. An object of the present invention is to improve the operation continuity at occurrence of a short-time grid fault in a power conversion system that transmits AC power generated by a power generator through a DC power grid to an AC power grid.

Solution to Problem

According to an aspect of the present invention, a power conversion system is a power conversion system that transmits AC power generated by a power generator through a DC power grid to an AC power grid. The power conversion system includes: an AC/DC power converter; a DC/DC power converter; and a control device to control the AC/DC power converter and the DC/DC power converter. The AC/DC power converter converts the AC power from the power generator into electric power of a first DC voltage, and outputs the electric power of the first DC voltage. The DC/DC power converter converts the electric power output from the AC/DC power converter into electric power of a second DC voltage, and outputs the electric power of the second DC voltage to the DC power grid. The control device includes a first drive control unit and a second drive control unit. The first drive control unit controls the AC/DC power converter such that an active current component and a reactive current component of an AC current output from the power generator follow an active current command value and a reactive current command value, respectively. The second drive control unit controls the DC/DC power converter such that the first DC voltage follows a DC voltage command value. Furthermore, when a fault occurs in the DC power grid or the AC power grid, the control device decreases at least one of the active current command value and the DC voltage command value in accordance with fluctuations of the second DC voltage, to suppress electric power that flows from the power generator into the AC/DC power converter.

Advantageous Effects of Invention

According to the present invention, in a power conversion system that transmits AC power generated by a power generator through a DC power grid to an AC power grid, when a short-circuit fault occurs in the DC power grid or the AC power grid, a control command value for an AC/DC power converter or a DC/DC power converter is adjusted so as to suppress incoming electric power flowing from the power generator in accordance with voltage fluctuations in the DC power grid. As a result, at occurrence of a short-time grid fault, occurrence of voltage fluctuations in the power conversion system is suppressed to thereby allow the operation continuity to be improved.

DESCRIPTION OF EMBODIMENTS

Figure 1:
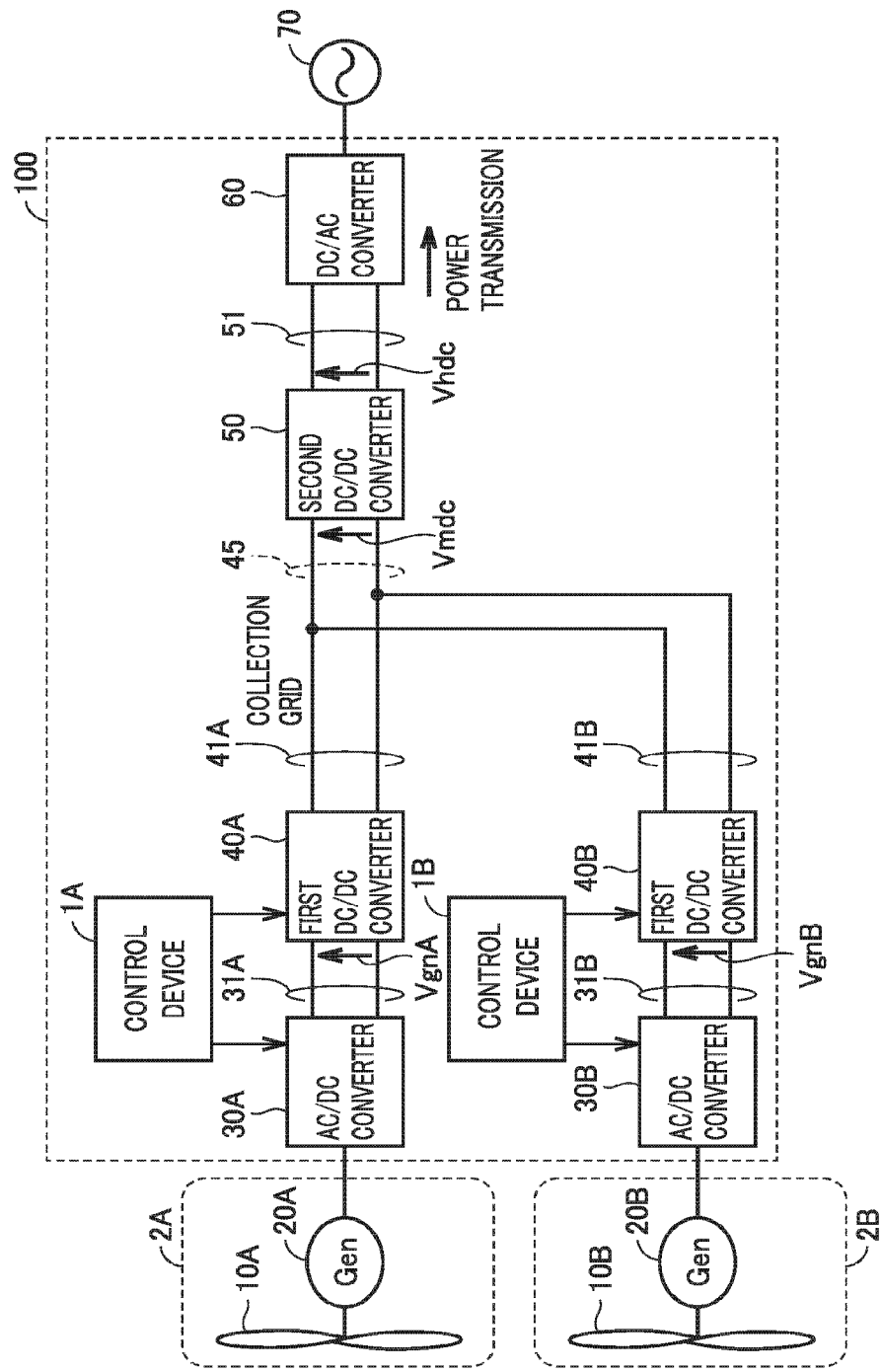
FIG. 1 is a block diagram illustrating the schematic configuration of a power conversion system 100 of a power conversion system according to the first embodiment.

The embodiments of the present invention will be hereinafter described in detail with reference to the accompanying drawings, in which the same or corresponding components are designated by the same reference characters, and description thereof will not be basically repeated.

First Embodiment

FIG. 1 is a block diagram illustrating the configuration of a power conversion system 100 according to the first embodiment.

Referring to FIG. 1, power conversion system 100 converts AC power generated by a plurality of wind power generation facilities 2A and 2B into DC power, collects electric power in the state of DC power, further steps up the collected DC power, and supplies AC power to an AC distribution grid 70. The number of wind power generation facilities connected to power conversion system 100 is two for convenience of illustration in FIG. 1, but any number of wind power generation facilities may be connected to power conversion system 100.

Wind power generation facilities 2A and 2B are installed on the sea or on a mountain, for example. Wind power generation facility 2A includes a windmill 10A and a power generator 20A coupled to a rotation shaft of windmill 10A. Wind power generation facility 2B includes a windmill 10B and a power generator 20B coupled to a rotation shaft of windmill 10B. Windmills 10A and 10B rotate so as to rotate respective rotors of power generators 20A and 20B, which then generate electric power to produce AC power.

Power conversion system 100 includes a control device 1A, an AC/DC power converter 30A, a power line 31A, a first DC/DC power converter 40A, and a collection line 41A that correspond to wind power generation facility 2A. Power conversion system 100 also includes a control device 1B, an AC/DC power converter 30B, a power line 31B, a first DC/DC power converter 40B, and a collection line 41B that correspond to wind power generation facility 2B. Power conversion system 100 further includes a second DC/DC power converter 50, a power transmission line 51, and a DC/AC power converter 60. In the following description, each of the AC/DC power converters, each of the DC/DC power converters, and each of the DC/AC power converters will be denoted simply as an AC/DC converter, a DC/DC converter, and a DC/AC converter, respectively.

Control device 1A controls AC/DC converter 30A and first DC/DC converter 40A. Control device 1B controls AC/DC converter 30B and first DC/DC converter 40B. Although not shown, control devices for second DC/DC converter 50 and the DC/AC converter are further disposed. Control devices 1A and 1B, each of which is representatively formed of a microcomputer, control the operations of AC/DC converter 30A and first DC/DC converter 40A and the operations of AC/DC converter 30B and first DC/DC converter 40B, respectively, by hardware processing by electronic circuits (not shown) incorporated therein and software processing by a central processing unit (CPU) (not shown) executing a program installed therein.

AC/DC converters 30A and 30B convert three-phase AC power generated by respective power generators 20A and 20B into DC power, and output the converted DC power to power lines 31A and 31B, respectively. In the following description, the DC power voltages on power lines 31A and 31B will also be referred to as "generated voltages VgnA and VgnB", respectively. First DC/DC converters 40A and 40B convert (step up) the DC power voltages (generated voltages VgnA and VgnB) converted by respective AC/DC converters 30A and 30B into different voltages, and output the converted voltages to respective collection lines 41A and 41B.

Collection lines 41A and 41B are connected in parallel on the input side of second DC/DC converter 50 to thereby form a collection grid 45. Collection grid 45 collects DC power that is obtained by converting the electric power generated by wind power generation facilities 2A and 2B. In the following description, the DC power voltage in collection grid 45 will be also referred to as a "collection voltage Vmdc".

Power conversion system 100 includes control devices 1A and 1B similarly configured, AC/DC converters 30A and 30B similarly configured, power lines 31A and 31B similarly configured, first DC/DC converters 40A and 40B similarly configured, and collection lines 41A and 41B similarly configured, which are disposed corresponding to respective wind power generation facilities 2A and 2B. These elements are denoted by reference numerals with suffixes A and B when the elements are distinguished from each other, whereas the elements are denoted by reference numerals with no suffix when the description is common to the elements.

In this way, power conversion system 100 is provided with a pair of AC/DC converter 30 and first DC/DC converter 40 so as to correspond to each of wind power generation facilities 2A and 2B. DC power stepped-up by first DC/DC converter 40 is collected. Furthermore, second DC/DC converter 50 collects the collected DC power and further steps up the collected DC power for implementing high-voltage DC transmission (HVDC). In the following description, the voltage of the DC power transmitted through power transmission line 51 (a DC power transmission grid) will be also referred to as a "transmission voltage Vhdc".

For example, when wind power generation facility 2 is installed on the sea, the devices from AC/DC converter 30 to second DC/DC converter 50 are disposed in a conversion station adjacent to wind power generation facility 2 on the sea. In the DC power transmission grid, the DC power converted by second DC/DC converter 50 is transmitted through power transmission line 51, for example, to land. The transmitted DC power is supplied to a DC/AC converter 60 installed in a conversion station on the land side. DC/AC converter 60 converts the DC power into AC power, and supplies the converted AC power to AC distribution grid 70.

In the configuration example in FIG. 1, power lines 31A and 31B (31) correspond to one example of the "first DC line"; collection lines 41A and 41B (41) correspond to one example of the "second DC line"; and collection grid 45 corresponds to one example of a "DC power grid". Furthermore, a generated voltage Vgn corresponds to one example of the "first DC voltage"; and collection voltage Vmdc corresponds to the "second DC voltage".

Figure 2:
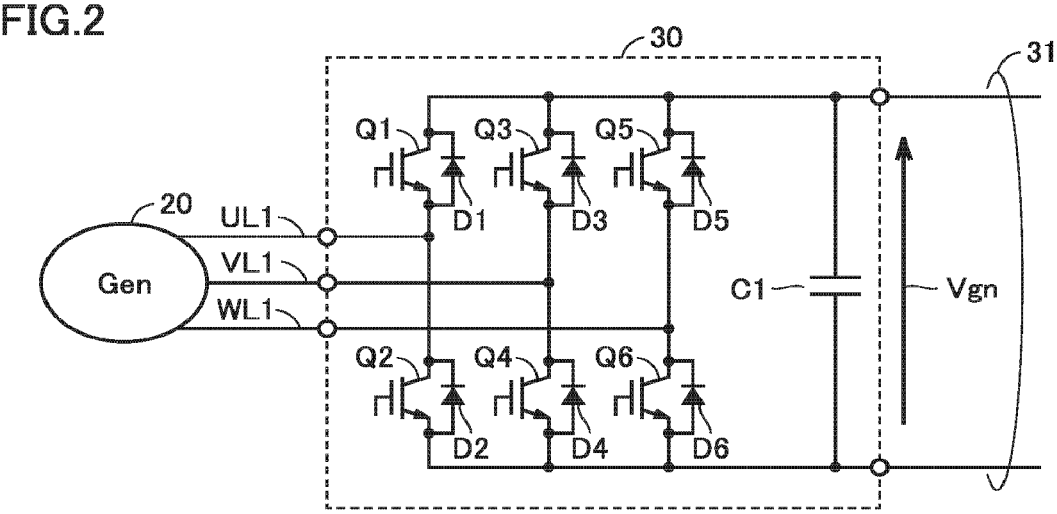
FIG. 2 is a circuit diagram showing a detailed configuration example of an AC/DC converter shown in FIG. 1.

FIG. 2 is a circuit diagram showing a configuration example of AC/DC converter 30 interconnected with power generator 20.

Referring to FIG. 2, AC/DC converter 30 includes: self-arc-extinguishing type semiconductor switching elements Q1 to Q6 that form a three-phase bridge circuit; diode elements D1 to D6 that are connected in antiparallel to semiconductor switching elements Q1 to Q6, respectively; and a smoothing capacitor C1. As semiconductor switching elements Q1 to Q6, insulated gate bipolar transistors (IGBT) may be representatively applicable without being limited thereto, and other self-arc-extinguishing type semiconductor switching elements may also be applicable. Semiconductor switching elements Q1 to Q6 correspond to the "first semiconductor switching elements".

The AC power generated by power generator 20 is supplied through power lines UL1, UV1, and UW1 to a three-phase bridge circuit of AC/DC converter 30 and then rectified. The DC power obtained by rectification is smoothed by smoothing capacitor C1 and supplied to power line 31. As a result, generated voltage Vgn is output from AC/DC converter 30 to this power line 31.

Figure 3:
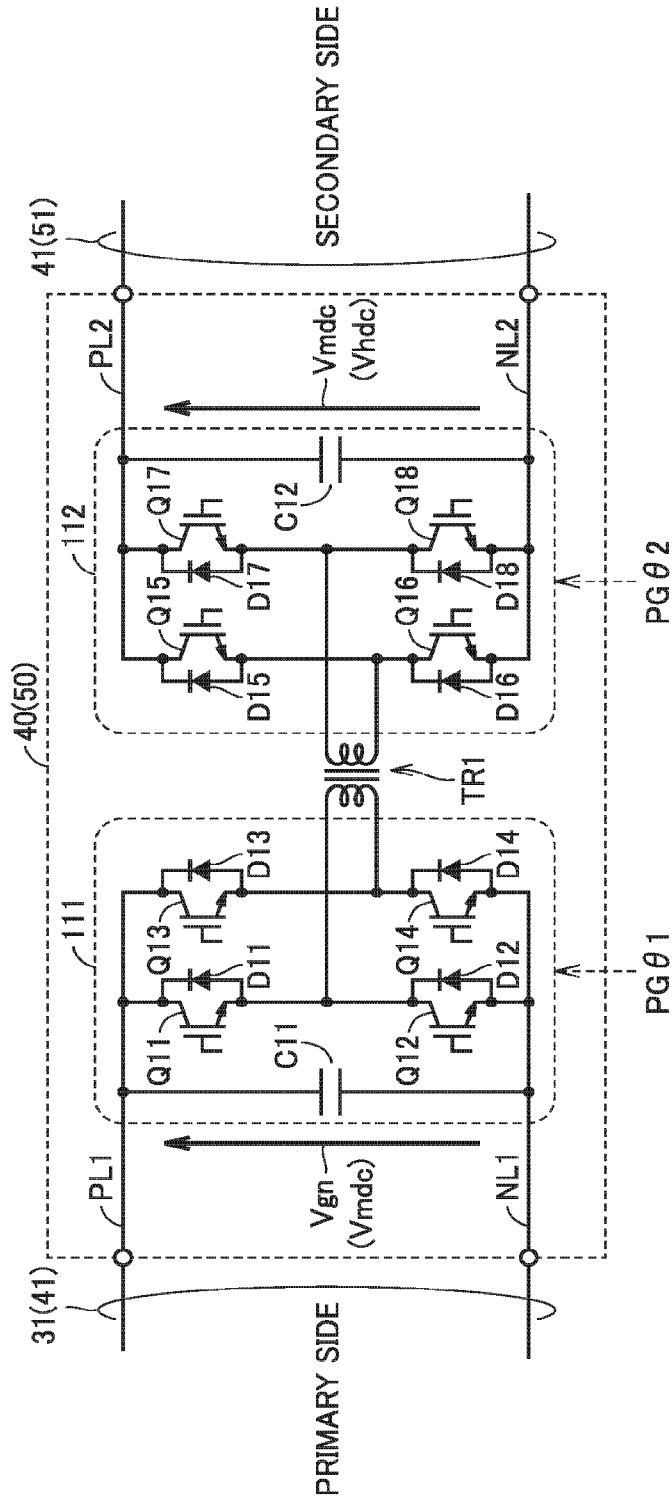
FIG. 3 is a circuit diagram showing a detailed configuration example of a first DC/DC converter shown in FIG. 1.

FIG. 3 is a circuit diagram illustrating a detailed configuration example of first DC/DC converter 40.

Referring to FIG. 3, first DC/DC converter 40 has an insulation-type dual active bridge (DAB) configuration that includes: two self-excited and full bridge-type inverter circuits 111, 112; an insulating transformer (hereinafter simply referred to as a "transformer") TR1; and smoothing capacitors C11, C12. The DC/DC converter for high power transmission generally has a high-voltage circuit configuration formed of series-parallel connection of a plurality of DC/DC conversion circuits each having an insulation-type DAB configuration, but a circuit configured in one stage will be hereinafter described by way of example for simplification of description.

Inverter circuit 111 includes: smoothing capacitor C11; semiconductor switching elements Q11 and Q12 connected in series; and semiconductor switching elements Q13 and Q14 connected in series, each of which is connected between power lines PL1 and NL1. Semiconductor switching elements Q11 to Q14 include diodes D11 to D14, respectively, that are connected in antiparallel thereto.

Power lines PL1 and NL1 on the primary side of first DC/DC converter 40 (on the primary winding side of transformer TR1) are connected to power line 31 through which generated voltage Vgn is output from AC/DC converter 30.

Inverter circuit 111 converts the DC power smoothed by smoothing capacitor C11 into AC power and outputs the converted AC power to transformer TR1. While ensuring electrical insulation, transformer TR1 transfers, to the secondary winding, the AC power supplied from inverter circuit 111 to the primary winding. The AC power of the secondary winding is input into inverter circuit 112.

Inverter circuit 112 is basically similar in configuration to inverter circuit 111. Specifically, inverter circuit 112 includes: semiconductor switching elements Q15 and Q16 connected in series; semiconductor switching elements Q17 and Q18 connected in series; and smoothing capacitor C12, each of which is connected between power lines PL2 and NL2. Semiconductor switching elements Q15 to Q18 include diodes D15 to D18, respectively, that are connected in antiparallel thereto.

Inverter circuit 112 charges and discharges smoothing capacitor C12 with the AC power supplied from transformer TR1 (on the secondary side) for smoothing, and then, outputs DC power (collection voltage Vmdc).

Inverter circuits 111 and 112 each are not limited to a full bridge-type inverter but may be a three-level inverter, for example. Also, FIG. 3 shows an example in which an IGBT is used as each of semiconductor switching elements Q11 to Q18 included in inverter circuits 111 and 112, but semiconductor switching elements Q11 to Q18 are not limited thereto and may be formed using other self-arc-extinguishing type semiconductor switching elements. Semiconductor switching elements Q11 to Q18 correspond to the "second semiconductor switching elements".

First DC/DC converter 40 and second DC/DC converter 50 have the same basic hardware configuration. In second DC converter 50, power lines PL1 and NL1 on the primary side are connected to a collection line 41 through which collection voltage Vmdc is output from first DC/DC converter 40. On the other hand, power lines PL2 and NL2 on the secondary side are connected to power transmission line 51 through which transmission voltage Vhdc is output.

Figure 4:
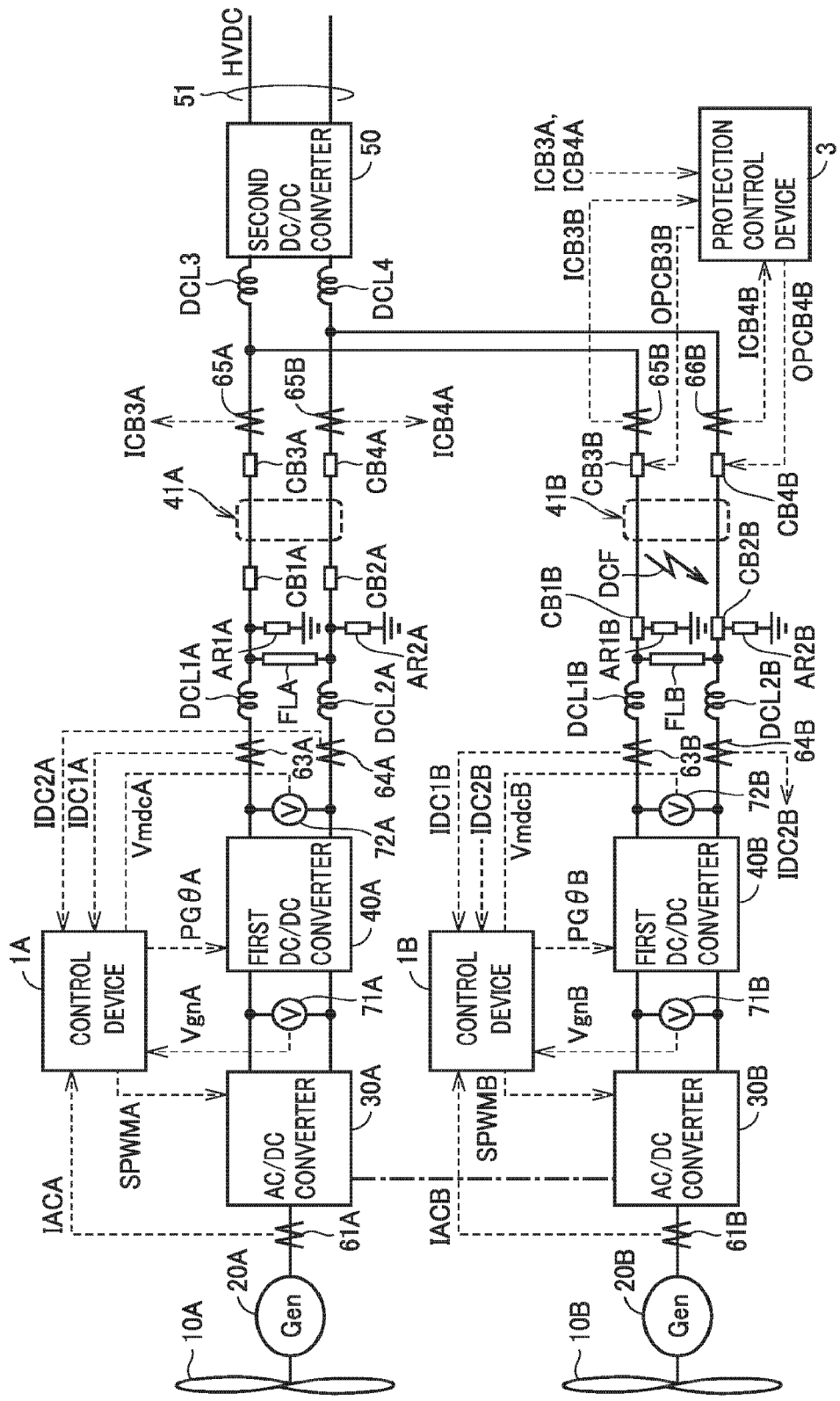
FIG. 4 is a block diagram illustrating the detailed configuration from a windmill to a second DC/DC converter in the power conversion system according to the first embodiment.

FIG. 4 is a block diagram illustrating the detailed configuration from a windmill 10 to second DC/DC converter 50 in the power conversion system according to the first embodiment.

Referring to FIG. 4, a fault protection function in DC lines of collection lines 41A and 41B (collection grid 45) will be first described. Collection lines 41A and 41B are provided with, as a protection device; DC reactors (DCL1A, DCL2A, DCL1B, DCL2B, DCL3, DCL4) for suppressing a fault current at occurrence of a DC line fault; DC circuit breakers (CB1A to CB4A, CB1B to CB4B); arresters (AR1A, AR2A, AR1B, AR2B) for protection from a surge voltage; and filters (FLA, FLB) for suppressing circuit resonance.

In power conversion system 100 having the above-described configuration, when a DC grid fault occurs on collection line 41B (for example, a DC line short-circuit fault at a DCF point in FIG. 4) in collection grid 45, a current flows from smoothing capacitor C12 on the secondary side of each of first DC/DC converters 40A and 40B and smoothing capacitor C11 on the primary side of second DC/DC converter 50 through DC reactors DCL1A, DCL1B, and DCL3 to a fault point. Thereby, collection voltage Vmdc decreases. Collection voltage Vmdc is detected by voltage detectors 72A and 72B connected to the respective secondary sides of first DC/DC converters 40A and 40B. As the current to the fault point passes through each DC reactor, an increase in the transient current and a decrease in collection voltage Vmdc at occurrence of a DC grid fault can be suppressed.

Based on current detection values ICB3B and ICB4B by respective current detectors 65B and 66B disposed on collection line 41B, a protection control device 3 outputs control commands (OPCB3B, OPCB4B) for opening DC circuit breakers CB3B and CB4B, respectively, when a DC line short-circuit fault occurs. Specifically, when current detection values ICB3B and ICB4B exceed a current threshold value IMAX (i.e., when |ICB3B|>IMAX and |ICB4B|>IMAX), and also, when it is detected that current detection values ICB3B and ICB4B are reversed in polarity (i.e., the current is transmitted in the direction opposite to the direction of the current that is normally transmitted), occurrence of a DC grid fault is detected, and DC circuit breakers CB3B and CB4B are opened. Thereby, after a lapse of interruption time of each DC circuit breaker (generally, about 10 [ms]), collection line 41B including a DCF point is disconnected from power conversion system 100. Due to disconnection by opening of DC circuit breakers CB3B and CB4B, a short-time recovery becomes difficult. Thus, AC/DC converter 30B and DC/DC converter 40B are stopped while the operation is continued by control device 1A for AC/DC converter 30A and DC/DC converter 40A that are interconnected with a sound path (collection line) 41A.

Also on collection line 41A, current detectors 65A and 65B are disposed in the same manner as current detectors 65B and 66B. Thus, based on the current detection values by current detectors 65A and 65B, occurrence of a DC line short-circuit fault (DC grid fault) on collection line 41A can be detected in the same manner as on collection line 41. Then, when occurrence of a DC grid fault on collection line 41A is detected, DC circuit breakers CB3A and CB4A are opened. In the case of the above-mentioned fault on collection line 41B, DC circuit breakers CB3A and CB4A do not detect a current in the reverse direction, so that the circuit breakers are not opened. Thus, control device 1A continues to control AC/DC converter 30A and DC/DC converter 40A.

The following is an explanation about control of AC/DC converter 30 and DC/DC converter 40.

Control device 1A receives inputs of: current detection values IACA, IDC1A, and IDC2A by current detectors 61A, 63A, and 64A, respectively; and voltage detection values VgnA and VmdcA by voltage detectors 71A and 72A, respectively.

Current detector 61A is disposed on the power lines (corresponding to UL1, VL1 and WL1 in FIG. 2) that connect power generator 20A and AC/DC converter 30A. Current detector 61A detects a generated current IACA by power generator 20A. Voltage detector 71A is connected to the primary side of first DC/DC converter 40A and detects a generated voltage VgnA. Current detectors 63A and 64A detect currents IDC1A and IDC2A, respectively, on the DC line (collection line 41A) on the secondary side of first DC/DC converter 40A. Voltage detector 72A is connected on collection line 41A to the end in close proximity to first DC/DC converter 40A and detects a collection voltage VmdcA.

Based on these current detection values IACA, IDC1A, IDC2A and voltage detection values VgnA, VmdcA, control device 1A outputs: a gate drive pulse signal PGθA for driving the semiconductor switching elements in first DC/DC converter 40A; and a gate drive signal SPWMA for driving the semiconductor switching elements in AC/DC converter 30A.

Similarly, control device 1B receives inputs of: current detection values IACB, IDC1B and IDC2B by current detectors 61B, 63B and 64B, respectively; and voltage detection values VgnB and VmdcB by voltage detectors 71B and 72B, respectively.

Current detector 61B detects generated current IACB by power generator 20B in the same manner as current detector 61A. In the same manner as voltage detector 71A, voltage detector 71B is connected to the primary side of first DC/DC converter 40B and detects generated voltage VgnB. In the same manner as current detectors 63A and 64A, current detectors 63B and 64B detect currents IDC1B and IDC2B, respectively, on collection line 41B. In the same manner as voltage detector 72A, voltage detector 72B is disposed on collection line 41B and detects collection voltage VmdcB.

Based on these current detection values IACB, IDC1B, IDC2B and voltage detection values VgnB, VmdcB, control device 1B outputs a gate drive pulse signal PGθB for driving the semiconductor switching elements in first DC/DC converter 40B and a gate drive signal SPWMB for driving the semiconductor switching elements in AC/DC converter 30B.

Again referring to FIG. 3, an explanation will be hereinafter given with regard to control of gate driving for the semiconductor switching elements in first DC/DC converter 40 by gate drive pulse signals PGθA and PGθB.

In inverter circuit 111, semiconductor switching elements Q11 and Q14 are turned on and off according to a first gate drive pulse signal PGθ1 while semiconductor switching elements Q12 and Q13 are turned on and off according to an inverted signal of first gate drive pulse signal PGθ1. Similarly, in inverter circuit 112, semiconductor switching elements Q15 and Q18 are turned on and off according to a second gate drive pulse signal PGθ2 while semiconductor switching elements Q16 and Q17 are turned on and off according to an inverted signal of second gate drive pulse signal PGθ2.

The above-mentioned gate drive pulse signal PGθA (FIG. 4) includes a first gate drive pulse signal PGθ1A and a second gate drive pulse signal PGθ2A in first DC/DC converter 40A. Gate drive pulse signal PGθB (FIG. 4) includes a first gate drive pulse signal PGθ1B and a second gate drive pulse signal PGθ2B in first DC/DC converter 40B. In other words, first gate drive pulse signal PGθ1 comprehensively represents first gate drive pulse signals PGθ1A and PGθ1B from first DC/DC converters 40A and 40B, respectively. Second gate drive pulse signal PGθ2 comprehensively represents second gate drive pulse signals PGθ2A and PGθ2B from first DC/DC converters 40A and 40B, respectively.

In the state where each of first and second gate drive pulse signals PGθ1 and PGθ2 is fixed at the same frequency and at 50% of duty ratio, the phase of the gate drive pulse signal from inverter circuit 111 on the primary side is shifted with respect to the phase of the second gate drive pulse signal from inverter circuit 112 on the secondary side, thereby allowing control of generated voltage Vgn.

Similarly, in the case of second DC/DC converter 50 that can be configured in the manner similar to first DC/DC converter 40, switching of semiconductor switching elements Q11 to Q18 is controlled in the same manner as first DC/DC converter 40 to thereby change the phase difference of the gate drive pulse signals between inverter circuits 111 and 112. Thereby, collection voltage Vmdc on collection line 41 at the input end of second DC/DC converter 50 can be controlled.

Figure 5:
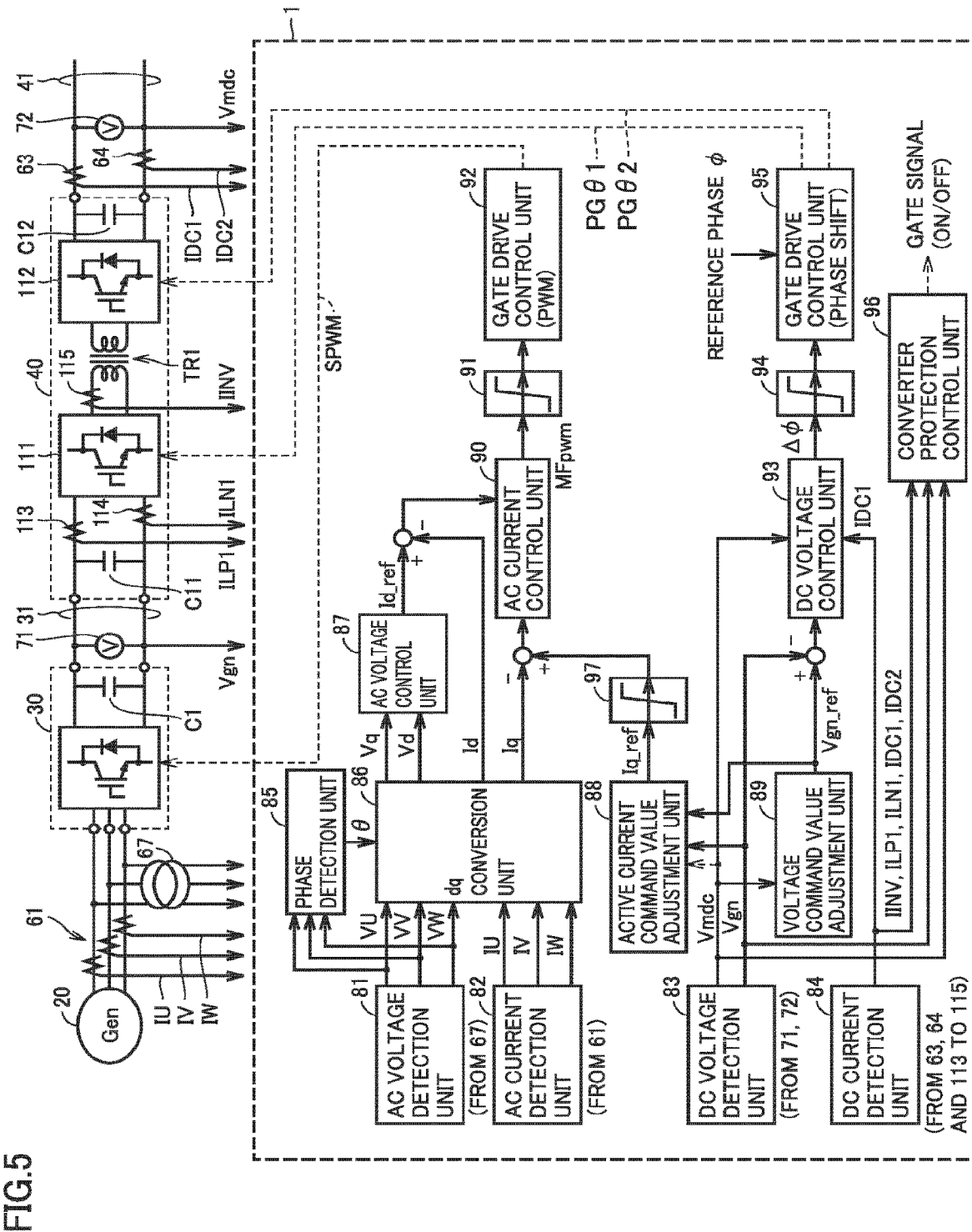
FIG. 5 is a control block diagram of the AC/DC converter and the first DC/DC converter controlled by a control device.

Again referring to FIG. 4, semiconductor switching elements Q1 to Q6 (FIG. 2) that form AC/DC converter 30 are turned on and off by pulse width modulation (PWM) control according to gate drive signals SPWMA and SPWMB shown in FIG. 5. As described below, the command value of this PWM control is set to control the active current (AC current) supplied from power generator 20.

As understood from FIG. 4, power conversion system 100 includes one pair of AC/DC converter 30 and first DC/DC converter 40, and control device 1 for each of a plurality of wind power generation facilities 2. In the case where AC/DC converter 30 and first DC/DC converter 40 exist on a fault path disconnected due to a DC line short-circuit fault, control devices 1A and 1B, each of which corresponds to such AC/DC converter 30 and first DC/DC converter 40, each determine that the operation cannot be continued based on the voltage detection value and the current detection value at each interconnection point, and then, stops AC/DC converter 30 and first DC/DC converter 40. For example, when a DC line short-circuit fault occurs at a DCF point in FIG. 4, control device 1B stops AC/DC converter 30B and first DC/DC converter 40B. The operation is continued by control device 1A for AC/DC converter 30A and DC/DC converter 40A that are interconnected with a sound path (collection line) 41A.

In general, for distributed power supplies of solar photovoltaic power generation, wind power generation and the like, requirements are defined for the FRT (fault ride through) in the case of grid disturbance, which is required for ensuring the quality of electric power. For example, for wind turbine generators, the time taken for the voltage at the interconnection point to decease to 0V is set to be equal to or less than 140 ms. Thus, in the case of grid disturbance caused by a short-time grid fault, power transmission is required to be resumed within the time satisfying the FRT requirements.

As described below, in power conversion system 100 according to the first embodiment, control device 1 controls AC/DC converter 30 and first DC/DC converter 40 at occurrence of a DC grid fault to stabilize the grid voltage speedily, thereby suppressing generation of an overvoltage and the like. Thus, the operation continuity can be improved.

FIG. 5 is a control block diagram of AC/DC converter 30 and first DC/DC converter 40 controlled by control device 1. The control blocks of AC/DC converter 30 and first DC/DC converter 40 comprehensively shown in FIG. 5 are applicable in common to: control of AC/DC converter 30A and first DC/DC converter 40A; and control of AC/DC converter 30B and first DC/DC converter 40B. The function of each block in the configuration shown in FIG. 5 can be implemented by at least one of hardware processing and software processing by control device 1.

Referring to FIG. 5, control device 1 includes a DC voltage detection unit 83, a DC current detection unit 84, a voltage command value adjustment unit 89, a DC voltage control unit 93, a phase limiter 94, and a gate drive control unit 95, which serve as a functional block for controlling first DC/DC converter 40. Gate drive control unit 95 generates first and second gate drive pulse signals PGθ1 and PGθ2 of first DC/DC converter 40 for controlling generated voltage Vgn.

DC voltage detection unit 83 detects generated voltage Vgn and collection voltage Vmdc based on the outputs from voltage detectors 71 and 72. Generated voltage Vgn is set based on: the voltage of smoothing capacitor C1 of AC/DC converter 30 (the synthesis value of the voltages of the smoothing capacitors in a multistage configuration); and the voltage of smoothing capacitor C11 on the primary side of first DC/DC converter 40 (the synthesis value of the voltages of the smoothing capacitors on the primary side in a multistage configuration). Also, collection voltage Vmdc is set based on: the voltage of smoothing capacitor C12 on the secondary side of first DC/DC converter 40 (the synthesis value of the voltages of the smoothing capacitors on the secondary side in a multistage configuration); and the voltage of the smoothing capacitor (not shown) on the primary side of second DC/DC converter 50.

As shown in FIG. 5, in addition to current detector 63 shown also in FIG. 5, current detectors 64 and 113 to 115 are further disposed in first DC/DC converter 40. Current detectors 113 and 114 are disposed on power line 31 at an end in close proximity to inverter circuit 111. Current detector 115 is disposed on the primary side of transformer TR1. Current detector 64 is disposed on the line on the lower voltage side of collection line 41 at an end in close proximity to inverter circuit 112. On the other hand, current detector 63 is disposed on the line on the lower voltage side of collection line 41.

Based on the outputs from current detectors 63, 64 and 113 to 115, DC current detection unit 84 detects output currents IDC1, IDC2, input currents ILP1, ILN1, and a converter current IINV.

Voltage command value adjustment unit 89 receives an input of a detection value of collection voltage Vmdc by DC voltage detection unit 83 and outputs a generated voltage command value Vgn_ref. When collection voltage Vmdc does not exceed the upper limit of the normal operation voltage, generated voltage command value Vgn_ref is set as a predetermined rated value (a rated voltage) of the collection voltage. For example, the upper limit of the normal operation voltage can be set to be about 110% of the above-mentioned rated voltage.

On the other hand, when collection voltage Vmdc exceeds the upper limit of the normal operation voltage, voltage command value adjustment unit 89 sets generated voltage command value Vgn_ref to be lower than the above-mentioned rated value. For example, the value (adjustment amount) obtained by multiplying the increase amount of collection voltage Vmdc with respect to the rated voltage (i.e., Vmdc−rated voltage) by K (K: a constant) is subtracted from the rated voltage, thereby allowing generated voltage command value Vgn_ref to be set. Generated voltage command value Vgn_ref is output approximately in a range of 80% to 110% of the rated voltage in order to suppress fluctuations of the generated voltage caused by a sudden change in the command value.

DC voltage control unit 93 receives an input of a voltage deviation $\Delta$Vgn of the detection value of generated voltage Vgn with respect to generated voltage command value Vgn_ref ($\Delta$Vgn=Vgn_ref−Vmdc), and calculates a phase difference $\Delta\phi$ used for controlling first DC/DC converter 40. Specifically, phase difference $\Delta\phi$ is calculated from: the feedback value based on the power conversion value of the above-mentioned voltage deviation Vgn; and the feed forward value according to the electric power output from first DC/DC converter 40. The electric power output from first DC/DC converter 40 can be calculated from the product of collection voltage Vmdc (voltage detector 72) and output current IDC1 (current detector 63). By feed forward of the electric power output from first DC/DC converter 40, the control response for collection voltage Vmdc can be enhanced.

Phase difference Δφ calculated by DC voltage control unit 93 is limited within a predetermined range (for example, equal to or less than ±60 degrees) by phase limiter 94. According to phase difference Δφ obtained after passage through phase limiter 94, gate drive control unit 95 generates first gate drive pulse signal PGθ1 (inverter circuit 111) and second gate drive pulse signal PGθ2 (inverter circuit 112). Between first and second gate drive pulse signals PGθ1 and PGθ2 that are fixed at 50% of duty ratio and at the same frequency, phase difference Δφ (after limitation by phase limiter 94) is provided. Specifically, phase difference Δφ is subtracted from a reference phase φ of second gate drive pulse signal PGθ2 in inverter circuit 112 to generate first gate drive pulse signal PGθ1. Semiconductor switching elements Q11 to Q18 that form inverter circuits 111 and 112 (FIG. 3) are turned on and off according to first and second gate drive pulse signals PGθ1 and PGθ2, to thereby uniformly control generated voltage Vgn. In other words, generated voltage command value Vgn_ref corresponds to one example of the "DC voltage command value", phase difference Δφ corresponds to one example of the "second control output", and gate drive control unit 95 corresponds to one example of the "second gate drive control unit". Furthermore, DC voltage control unit 93 and gate drive control unit 95 can form one example of the "second drive control unit".

Furthermore, control device 1 includes an AC voltage detection unit 81, an AC current detection unit 82, a phase detection unit 85, a dq conversion unit 86, an AC voltage control unit 87, an active current command value adjustment unit 88, an active current command value limiter 97, an AC current control unit 90, a modulation factor limiter 91, and a gate drive control unit 92, which serve as a functional block for controlling AC/DC converter 30. Gate drive control unit 92 generates a gate drive signal SPWM (which comprehensively represent SPWMA and SPWMB) for AC/DC converter 30 for controlling an active current.

From the output from voltage detector 67 disposed on the power lines (corresponding to UL1, VL1 and WL1 in FIG. 2) that connect power generator 20 and AC/DC converter 30, AC voltage detection unit 81 detects the voltages (VU, VV, VW) in the respective phases (a U-phase, a V-phase, and a W-phase) of the three-phase AC power output from power generator 20. Phase detection unit 85 outputs a phase θ of the output from the power generator based on the detection values of the three-phase AC voltages (VU, VV, VW).

From the output from current detector 61 also shown in FIG. 4, AC current detection unit 82 detects the phase currents (IU, IV and IW) of the three-phase AC power from power generator 20. Then, dq conversion unit 86 performs dq conversion of the three-phase voltages and the three-phase currents using the AC voltages (VU, VV, VW), the AC currents (IU, IV, IW), and phase θ. Then, dq conversion unit 86 outputs a d-axis voltage Vd, a q-axis voltage Vq, a d-axis current Id, and a q-axis current Iq.

AC voltage control unit 87 generates a reactive current command value Id_ref from the voltages (Vd, Vq) obtained by dq conversion. Active current command value adjustment unit 88 generates an active current command value Iq_ref based on generated voltage Vgn from DC voltage detection unit 83 and generated voltage command value Vgn_ref from voltage command value adjustment unit 89. For example, the value (adjustment amount) obtained by multiplying, by h (h: a constant), the increase amount of generated voltage Vgn with respect to generated voltage command value Vgn_ref (Vgn−Vgn_ref) as a target value of generated voltage Vgn is subtracted from the predetermined active current command value in the normal state (in this case, the maximum value is 1 pu), thereby generating active current command value Iq_ref.

Active current command value Iq_ref calculated by active current command value adjustment unit 88 is limited within a predetermined range (for example, 0% to 110% of the rated current) by active current command value limiter 97.

AC current control unit 90 receives inputs of: a current deviation ΔIq with respect to active current command value Iq_ref (ΔIq=Iq_ref−Iq); and a current deviation ΔId with respect to reactive current command value Id_ref (ΔId=Id_ref−Id). Through feedback control operation by proportional-integral (PI) control or the like, AC current control unit 90 calculates a pulse width modulation factor MFpwm in AC/DC converter 30 so as to set current deviations ΔIq and ΔIq to be zero. Pulse width modulation factor MFpwm calculated by AC current control unit 90 is limited by modulation factor limiter 91 to fall within a predetermined range such that AC/DC converter 30 is controlled within the stable operation region. According to pulse width modulation factor MFpwm obtained after passage through modulation factor limiter 91, gate drive control unit 92 generates gate drive signal SPWM for driving semiconductor switching elements Q1 to Q6 in AC/DC converter 30. In other words, pulse width modulation factor MFpwm corresponds to one example of the "first control output", and gate drive control unit 92 corresponds to one example of the "first gate drive control unit". Furthermore, AC current control unit 90 and gate drive control unit 92 can form one example of the "first drive control unit".

For example, according to the voltage comparison between: the U-phase, V-phase and W-phase modulation waves (sinusoidal waves) that are different in phase by 120 degrees; and the carrier wave of the constant frequency, gate drive signal SPWM is generated so as to control turning on and off of the semiconductor switching elements in the U-phase (Q1, Q2), the V-phase (Q3, Q4), and the W-phase (Q5, Q6). In this case, the respective phase modulation waves mentioned above each are generated so as to have the same frequency as that of the generated electric power and to have an amplitude corresponding to the pulse width modulation factor.

By turning on and off each of semiconductor switching elements Q1 to Q6 (FIG. 2) according to gate drive signal SPWM, AC/DC converter 30 can control the active current supplied from power generator 20.

In this way, according to active current command value Iq_ref, AC/DC converter 30 controls the active current supplied from power generator 20 to power conversion system 100. Also, according to generated voltage command value Vgn_ref, first DC/DC converter 40 controls generated voltage Vgn (on power line 31). Although detailed description will not be given, in the normal power transmission operation, collection voltage Vmdc on collection line 41 is controlled by second DC/DC converter 50 while transmission voltage Vhdc on power transmission line 51 is controlled by DC/AC converter 60.

Furthermore, control device 1 includes a converter protection control unit 96 for device protection from an overvoltage and an overcurrent. Converter protection control unit 96 outputs an OFF command for the gate signal when the DC voltage (Vmdc) detected by DC voltage detection unit 83 and the DC currents (IINV, ILP1, ILP2, IDC1, IDC2) detected by DC current detection unit 84 exceed their respective predetermined upper limit values. When the OFF command is generated, first DC/DC converter 40 is brought into a gate block state and each of semiconductor switching elements Q11 to Q18 is maintained in an OFF state. On the other hand, when the ON command for the gate signal is output, the gate block state of first DC/DC converter 40 is canceled (gate deblock) and semiconductor switching elements Q11 to Q18 are turned on and off according to first and second gate drive pulse signals PGθ1 and PGθ2 that are generated by gate drive control unit 95.

Figure 6:
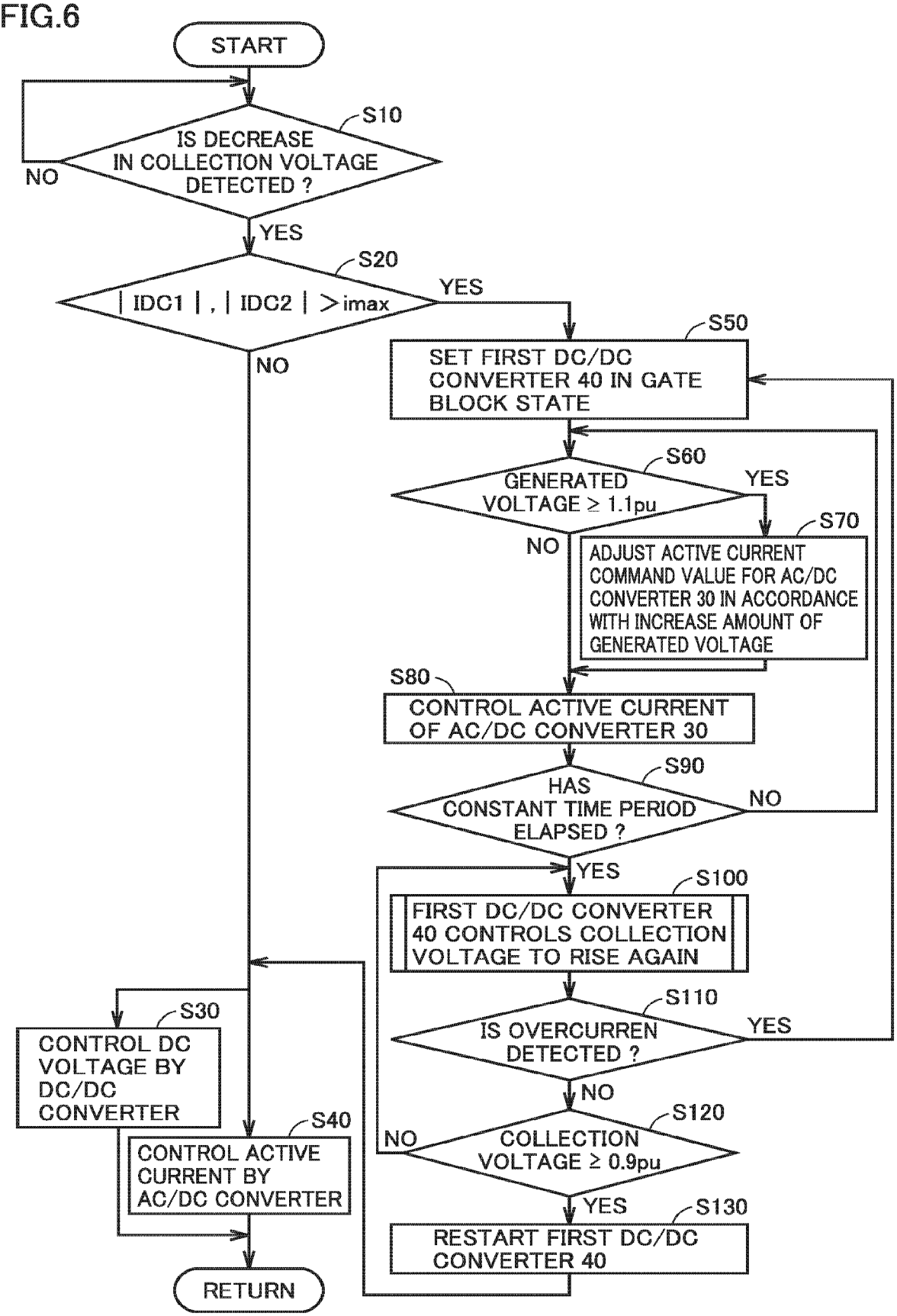
FIG. 6 is a flowchart illustrating a control process performed at occurrence of a DC grid fault in the power conversion system according to the first embodiment.

When a DC grid fault described with reference to FIG. 4 occurs in the control configuration of power conversion system 100 shown in FIG. 5, the control process shown in FIG. 6 is performed for each AC/DC converter 30 and each DC/DC converter 40.

As described with reference to FIG. 4, when a DC short-circuit fault occurs at a DFC point on collection line 41B, discharging occurs from smoothing capacitor C12 (FIG. 3) connected to the secondary side of each of first DC/DC converters 40A and 40B and smoothing capacitor C11 (FIG. 3) connected to the primary side of second DC/DC converter 50 to the DFC point as a fault point. Thereby, collection voltage Vmdc on collection line 41 decreases. Discharging to a fault point is continued until the fault path is electrically disconnected from collection line 41 by opening DC circuit breakers CB3B and CB4B by protection control device 3.

In step S10, control device 1 determines whether or not voltage detector 73 detects a decrease in collection voltage Vmdc at the end in close proximity to the secondary side of first DC/DC converter 40. For example, when collection voltage Vmdc decreases to be equal to or less than approximately 20% of the rated voltage, a "decrease in the collection voltage" is detected, and it is determined as YES in step S10. When a decrease in the collection voltage is detected, the process in and after step S20 is started to start the control process performed at occurrence of a DC grid fault.

In step S20, control device 1 determines whether at least one of output currents IDC1 and IDC2 from first DC/DC converter 40 by current detectors 63 and 64 exceeds a withstand current threshold value Imax or not. In other words, when at least one of |IDC1|>Imax and |IDC2|>Imax is satisfied, it is determined as YES in step S20 and an overcurrent is detected. When a DC short-circuit fault occurs, normally, a short-circuit current flows into a fault point. Thus, a decrease in the collection voltage is detected in a short while in step S10, and thereafter, an overcurrent is detected. In the case where no overcurrent is detected even if a predetermined time period elapses since it is determined as YES in step S10, then, it is determined as NO in step S20. Further, in steps S30 and S40, AC/DC converter 30 and first DC/DC converter 40 each perform normal control. In other words, as described with reference to FIG. 5, control (S30) of the DC voltage (generated voltage Vgn) by first DC/DC converter 40 and control (S40) of the active current by AC/DC converter 30 are performed.

On the other hand, when an overcurrent is detected (when it is determined as YES in S20), in step S50, control device 1 sets first DC/DC converter 40 in a gate block state in order to prevent an overcurrent from flowing through each semiconductor switching element. In step S50, converter protection control unit 96 (FIG. 5) outputs an OFF command for a gate signal, thereby turning off each of semiconductor switching elements Q11 to Q18.

While first DC/DC converter 40 is in the gate block state, control of generated voltage Vgn by first DC/DC converter 40 is stopped and electric power flows in from power generator 20, with the result that generated voltage Vgn rises.

In step S60, control device 1 determines whether generated voltage Vgn detected by voltage detector 71 exceeds a normal operation range (approximately 110% of the rated voltage) or not. When generated voltage Vgn exceeds the normal operation range (when it is determined as YES in S60), then in step S70, control device 1 adjusts the active current command value for AC/DC converter 30. Specifically, active current command value adjustment unit 88 (FIG. 5) sets adjusted active current command value Iq_ref by subtracting the difference between generated voltage Vgn (Vgn≥1.1 pu) and the rated voltage of the generated voltage, i.e., the value (adjustment amount) corresponding to the increase amount of the generated voltage with respect to the rated voltage, from the active current command value (its maximum value is 1 pu in normal power transmission). The upper limit voltage (for example, 1.1 pu) in the normal operation range determined in step S60 corresponds to one example of the "first voltage".

On the other hand, when generated voltage Vgn is within the normal operation range (when it is determined as NO in S60), step S70 is skipped and the active current command value is not corrected.

In step S80, control device 1 performs feedback control of the active current of AC/DC converter 30 such that an active current Iq obtained by dq conversion of the three-phase AC currents (IU, IV, IW) detected by current detector 61 follows active current command value Iq_ref. Thereby, in accordance with the increase amount of the generated voltage, the active current command value can be corrected to control the active current. As a result, the amount of incoming electric power flowing from power generator 20 can be suppressed to thereby suppress a rise in generated voltage Vgn.

In the case where controlling the active current by AC/DC converter 30 (S60 to S80) is continued for a predetermined constant time period (determined as NO in S90), then in steps S100 to S120, control device 1 causes first DC/DC converter 40 to autonomously control the collection voltage to rise again. The constant time period is set to fall within a time period satisfying the FRT requirements, which is approximately 20 [ms] to 100 [ms], for example.

Thereby, when a constant time period satisfying the FRT requirements elapses after a DC short-circuit fault occurs and before the information as to whether the fault path (collection line 41B in the example in FIG. 4) has been interrupted or not is obtained by communication from protection control device 3 (FIG. 4), first DC/DC converter 40 can be started to autonomously control the collection voltage to rise again (S100).

Figure 7:
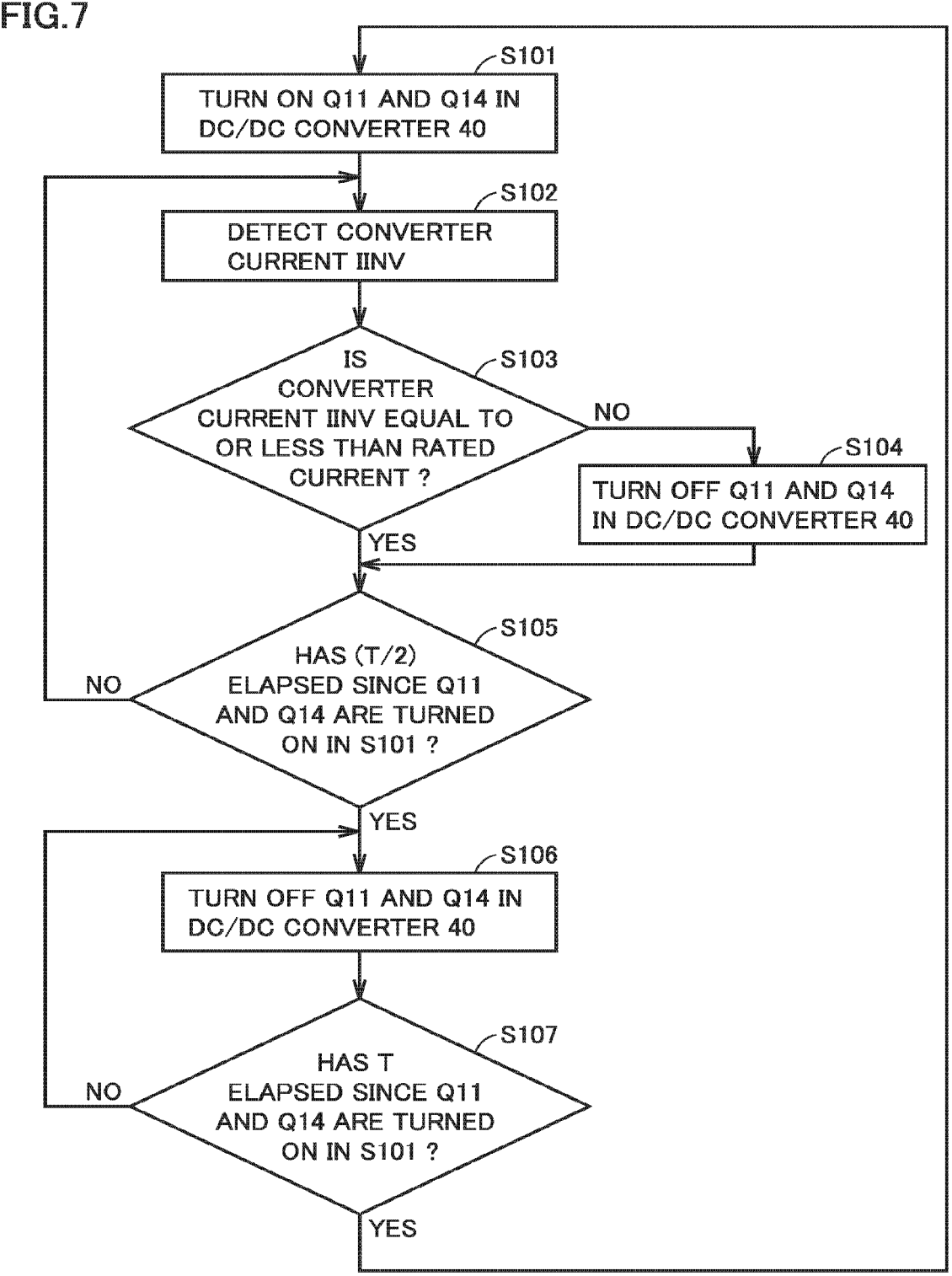
FIG. 7 is a flowchart for illustrating details of a control process for controlling a collection voltage to rise again.

FIG. 7 is a flowchart for illustrating details of the control process in step S100 for controlling the collection voltage to rise again.

Referring to FIG. 7, in step S101, control device 1 turns on semiconductor switching elements Q11 and Q14 (FIG. 3) in first DC/DC converter 40. In this state, in step S102, control device 1 detects converter current IINV based on the output from current detector 115. Then in step S103, control device 1 determines whether or not converter current IINV is equal to or less than the rated current on the primary side of first DC/DC converter 40.

When converter current IINV is equal to or less than the rated current (when it is determined as YES in S103), semiconductor switching elements Q11 and Q14 each are maintained in the ON state. In contrast, when converter current IINV exceeds the rated current (when it is determined as NO in S103), semiconductor switching elements Q11 and Q14 are turned off in step S104.

In step S105, control device 1 determines whether a time period (T/2) corresponding to the half period of a predetermined switching period T has elapsed or not since semiconductor switching elements Q11 and Q14 are turned on in step S101. Until (T/2) elapses (when it is determined as NO in S105), semiconductor switching elements Q11 and Q14 are controlled to be turned on and off in steps S102 to S104.

Figure 8:
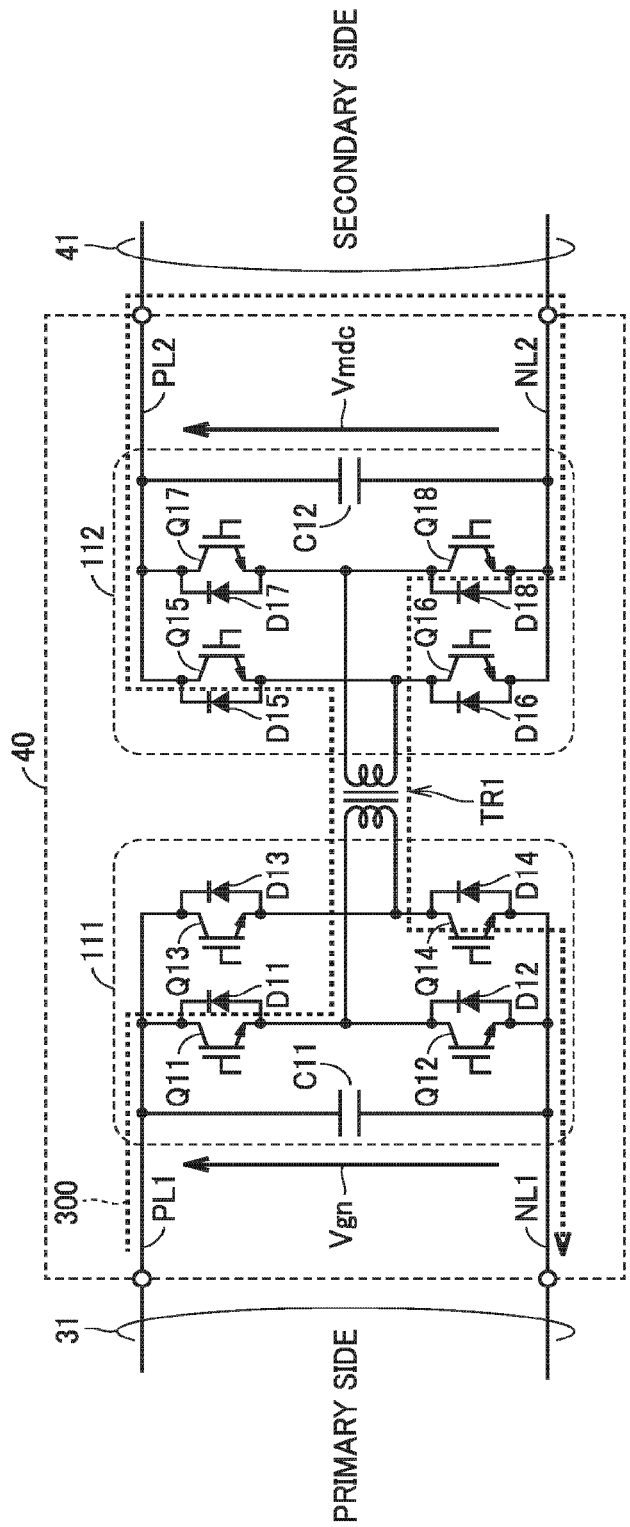
FIG. 8 is a circuit diagram showing a current path in the first DC/DC converter in control of the collection voltage to rise again.

FIG. 8 shows a current path in first DC/DC converter 40 in control of the collection voltage to rise again.

Referring to FIG. 8, semiconductor switching elements Q11 and Q14 are turned on to form a current path on the primary side of transformer TR1. Thereby, electromotive force occurs also on the secondary side of transformer TR1. By this electromotive force, a current path caused by conduction of diodes D15 and D18 is formed on the secondary side of transformer TR1. As a result, in first DC/DC converter 40, an equivalent current path 300 is formed so as to extend in order of power line 31 (high voltage side)-semiconductor switching element Q11-transformer TR1-diode D15-smoothing capacitor C12-diode D16-transformer TR1-semiconductor switching element Q14-power line 31 (low voltage side), as indicated by a dotted line in the figure.

Through this current path 300, smoothing capacitor C12 is charged while smoothing capacitor C11 (FIG. 3) on the primary side of second DC/DC converter 50 is also charged. Thus, collection voltage Vmdc decreased due to the DC grid fault can be raised.

Again referring to FIG. 7, when (T/2) elapses (when it is determined as YES in S105), control device 1 turns off semiconductor switching elements Q11 and Q14 in step S106. Thereby, semiconductor switching elements Q11 to Q14 are turned off. Furthermore, in step S107, it is determined whether switching period T has elapsed or not since semiconductor switching elements Q11 and Q14 are turned on in step S101. Then, semiconductor switching elements Q11 to Q14 each are kept in the OFF state (S106) until switching period T elapses.

As a result, in the first half of (T/2) in switching period T, based on (T/2) as a maximum value, semiconductor switching elements Q11 and Q14 are turned on for the length of the time period during which IINV is maintained to be equal to or less than the rated current. Thereby, electric power can be supplied to the secondary side of first DC/DC converter 40. On the other hand, in the last half of (T/2), semiconductor switching elements Q11 to Q14 are turned off, with the result that power supply to the secondary side is stopped.

When switching period T has elapsed (when it is determined as YES in S107), control device 1 returns the process to step S101. Thereby, the ON periods of semiconductor switching elements Q11 and Q14 can be controlled in a similar manner in each switching period T. Thus, in the case where the collection voltage is controlled to rise again in step S100, the duty ratio at the time of ignition of semiconductor switching elements Q11 and Q14 is controlled to be equal to or less than 50(%), and also adjusted to be within the range of 0(%) to 50(%) so as to keep converter current IINV to be equal to or less than the rated current.

Again referring to FIG. 6, while the collection voltage is controlled to rise again (S100), control device 1 determines in step S110 whether an overcurrent is detected or not, and determines in step S120 whether or not collection voltage Vmdc rises to be equal to or greater than 0.9 pu. Overcurrent detection in step S110 can be performed based on the determination similar to that in step S20.

When generation of an overcurrent is detected when the collection voltage is controlled to rise again (S100) (when it is determined as YES in S110), control device 1 determines that the grid (collection line 41B) having a DC line short-circuit fault is not interrupted. Then, control device 1 returns the process to step S50. Thereby, first DC/DC converter 40 is again set in a gate block state.

When an overcurrent is not detected (when it is determined as NO in S110), control device 1 continuously causes first DC/DC converter 40 to control the collection voltage to rise again (S100) until collection voltage Vmdc rises to be equal to or greater than 0.9 pu (when it is determined as NO in S120).

When collection voltage Vmdc rises to be equal to or greater than 0.9 pu (when it is determined as YES in S120), control device 1 restarts the normal control by first DC/DC converter 40 in step S130. Thereby, power conversion system 100 returns from the operation for a fault performed upon overcurrent detection in and after step S50 to the normal power transmission operation under active current control by AC/DC converter 30 (S30) and generated voltage control by first DC/DC converter 40 (S40).

Furthermore, as understood from the control process in FIG. 6, the control of the collection voltage by first DC/DC converter 40 to rise again (S100) is autonomously started after a DC short-circuit fault occurs and before the information as to whether the fault path (collection line 41B in the example in FIG. 4) has been interrupted or not is obtained by communication from protection control device 3 (FIG. 4). Thus, collection voltage Vmdc can be immediately recovered. At this time, overcurrent detection is performed in step S110. Thereby, even if the control of the collection voltage by first DC/DC converter 40 to rise again is started autonomously, this control can be prevented from being continued in the state where the DC line short-circuit fault is not interrupted.

As described above, according to the power conversion system in the first embodiment, in the situation where first DC/DC converter 40 is temporarily stopped by overcurrent protection when a DC line short-circuit fault occurs on collection line 41 (collection grid 45), the active current command value is adjusted in accordance with generated voltage Vgn and AC/DC converter 30 controls the active current. Thus, first DC/DC converter 40 autonomously allows the duty ratio to be variable so as to allow the collection voltage to rise again. Thereby, first DC/DC converter 40 can be immediately restarted at occurrence of a short-time grid fault, so that the operation continuity of the power conversion system can be improved.

Second Embodiment

The above first embodiment has been described with regard to the control performed by the converter at occurrence of a DC grid fault in the collection grid, whereas the second embodiment will be described with regard to the operation for a fault performed at occurrence of a fault in the AC grid.

Also in the second embodiment, the configuration of power conversion system 100 and the control performed in the normal power transmission operation are the same as those in the first embodiment, and therefore, the detailed explanation thereof will not be repeated.

Figure 9:
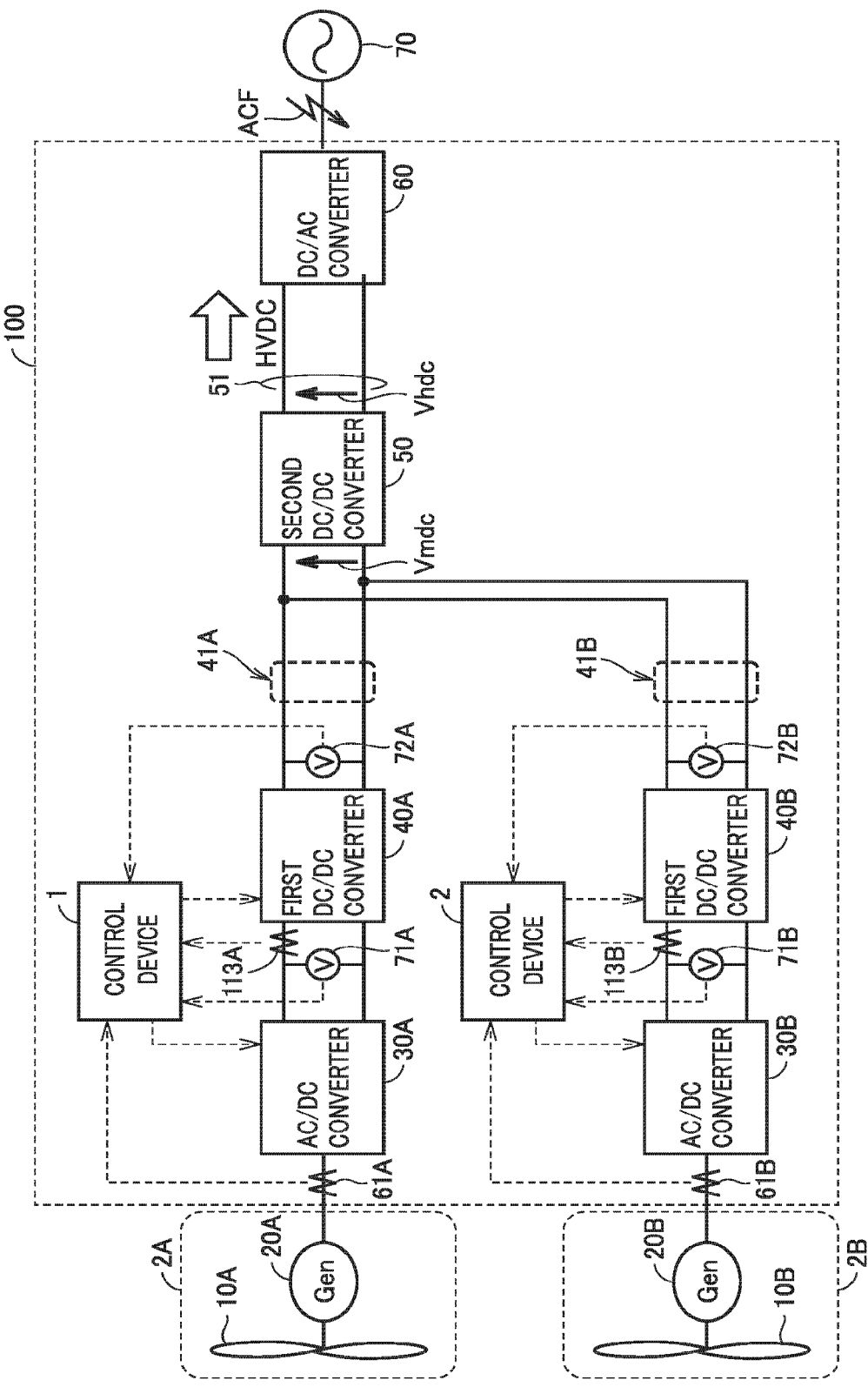
FIG. 9 is a block diagram illustrating a point of occurrence of an AC grid fault described in the second embodiment.

FIG. 9 is a block diagram illustrating a point of occurrence of an AC grid fault described in the second embodiment.

Referring to FIG. 9, in power conversion system 100 having the same configuration as that in FIG. 1, when a short-circuit fault occurs at an ACF point at an end in close proximity to DC/AC converter 60 in AC distribution grid 70, the voltage suddenly drops in the AC grid, and DC/AC converter 60 detects an overcurrent and temporarily stops its operation.

When DC/AC converter 60 stops, the target of voltage control by second DC/DC converter 40 is switched from collection voltage Vmdc on collection line 41 (the primary side) to transmission voltage Vhdc on power transmission line 51 (the secondary side). Thereby, the disturbance of transmission voltage Vhdc, i.e., HVDC grid voltage, can be suppressed. However, DC/AC converter 60 is stopped to thereby disallow transmission of electric power generated in wind power generation facility 2. Thus, electric power is excessively generated and the collection voltage rises.

Furthermore, when an AC grid fault occurs at a distance from DC/AC converter 60, the decrease amount of the AC grid voltage is small. Thus, DC/AC converter 60 may not detect an overcurrent but may be continuously operated while controlling the transmission voltage in the normal operation range. In this case, transmission voltage Vhdc can be uniformly controlled by DC/AC converter 60. On the other hand, power transmission from DC/AC converter 60 to AC distribution grid 70 is however prohibited or limited by protection control in AC distribution grid 70. As a result, since the electric power generated in wind power generation facility 2 exceeds the transmission electric power, the collection voltage is to rise inside power conversion system 100. In this way, a fault occurring in AC distribution grid 70 causes a problem that the collection voltage rises inside power conversion system 100.

Figure 10:
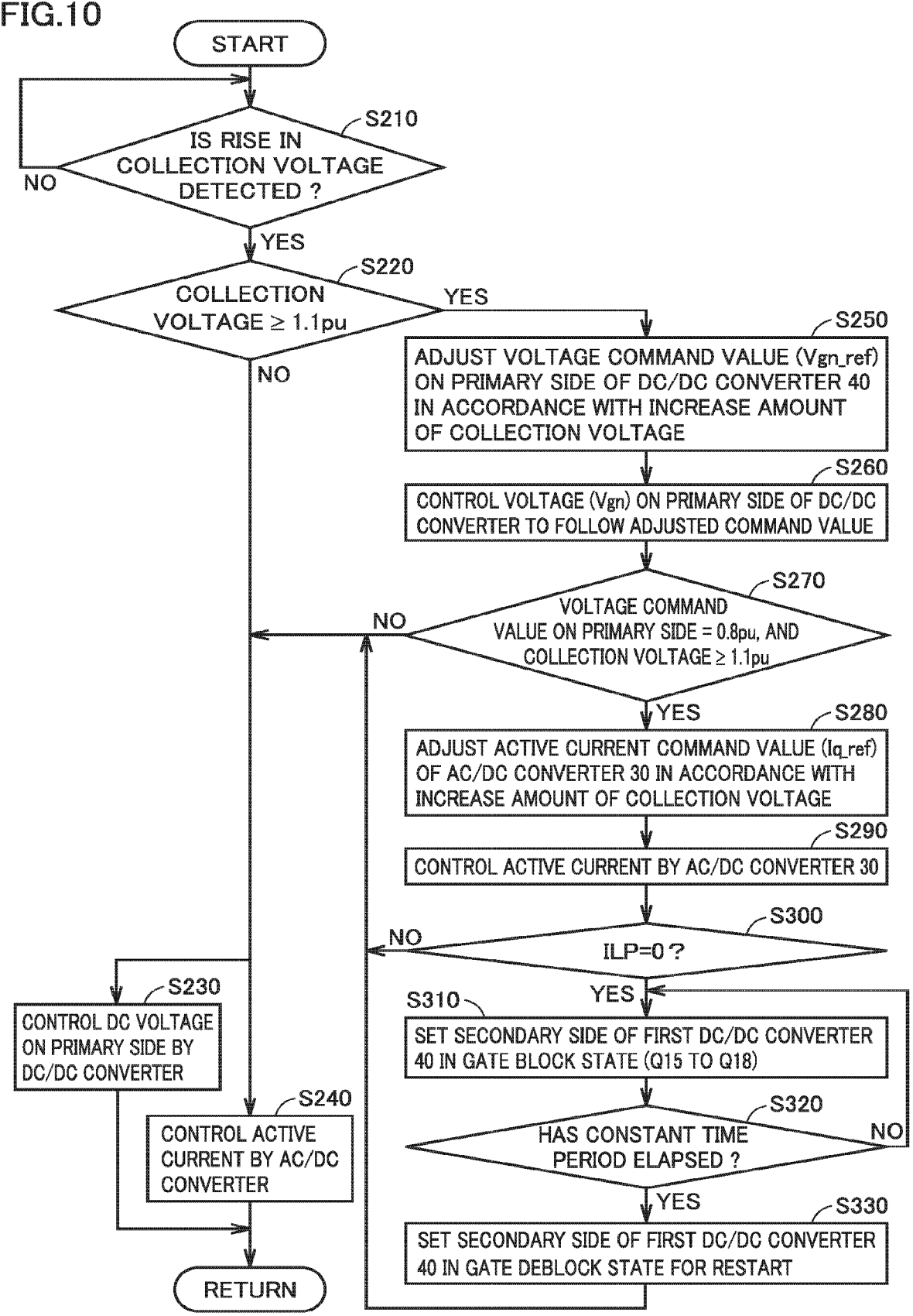
FIG. 10 is a flowchart illustrating a control process performed at occurrence of an AC grid fault in a power conversion system according to the second embodiment.

FIG. 10 is a flowchart illustrating a control process performed at occurrence of an AC grid fault by a power conversion system according to the second embodiment.

Referring to FIG. 10, in step S210, control device 1 determines whether or not voltage detector 72 detects a rise in collection voltage Vmdc at the end in close proximity to the secondary side of first DC/DC converter 40. When the collection voltage rises (when it is determined as YES in S210), it is determined in step S220 whether or not the detection value of collection voltage Vmdc is equal to or greater than 1.1 times (1.1 pu) as high as the rated voltage. The determination value (for example, 1.1 pu) in step S220 corresponds to one example of the "second voltage".

When the detection value of collection voltage Vmdc is less than 1.1 pu (when it is determined as NO in S220), control device 1 causes first DC/DC converter 40 to control generated voltage Vgn (the DC voltage on the primary side) in step S230 and causes AC/DC converter 30 to control the active current input from power generator 20 in step S240.

When the detection value of collection voltage Vmdc is equal to or greater than 1.1 pu (when it is determined as YES in S220), then in step S250, control device 1 adjusts voltage command value Vgn_ref of the DC voltage (generated voltage Vgn) on the primary side of first DC/DC converter 40. Specifically, in the second embodiment, voltage command value adjustment unit 89 subtracts collection voltage Vmdc (detection value) and the value (adjustment amount) corresponding to the increase amount of the collection voltage with respect to the rated voltage (Vmdc−rated voltage) from the generated voltage command value (1.0 pu in the normal power transmission), to thereby set an adjusted generated voltage command value Vgn_ref. For example, the above-mentioned adjustment amount can be calculated by multiplying, by a predetermined coefficient, the value obtained by subtracting the rated voltage from the detection value of collection voltage Vmdc.

In step S260, control device 1 causes first DC/DC converter 40 to perform feedback control of generated voltage Vgn according to generated voltage command value Vgn_ref adjusted in step S250.

As described with reference to FIG. 5, the upper limit value of active current command value Iq_ref of AC/DC converter 30 is limited by active current command value limiter 97. Thus, active current command value Iq_ref is limited from increasing such that the electric power input from power generator 20 to power conversion system 100 is maintained uniformly even when generated voltage command value Vgn_ref is decreased. As a result, by decreasing generated voltage command value Vgn_ref (S250), electric power flowing from power generator 20 (wind power generation facility 2) into power conversion system 100 can be reduced. Accordingly, a rise in collection voltage Vmdc can be suppressed.

In the case where the voltage remaining in the AC grid due to an AC grid fault is equal to or greater than the lower limit value (approximately 80%) of the normal operation range, DC/AC converter 60 is not stopped by an overcurrent. Thus, the voltage on the primary side (generated voltage Vgn) in first DC/DC converter 40 is controlled to be decreased to thereby suppress a rise in the collection voltage, so that power transmission can be continued.

On the other hand, in the case where the voltage remaining in the AC grid is low, such as the case where an AC grid fault occurs at the end in close proximity to DC/AC converter 60, DC/AC converter 60 is stopped by overcurrent protection, and power transmission is temporarily stopped. When DC/AC converter 60 is stopped by overcurrent protection, the transmission voltage cannot be controlled. Thus, control device 1 detects a rise of the transmission voltage, and switches the target of voltage control by second DC/DC converter 50 from the collection voltage (on collection line 41) to the transmission voltage (on power transmission line 51) so as to suppress fluctuations of the transmission voltage. Such switching of the control target then causes a problem that a collection voltage rises.

In step S270, control device 1 detects a phenomenon in which: generated voltage command value Vgn_ref of first DC/DC converter 40 becomes equal to the lower limit value of the normal operation voltage (approximately 80% of the rated voltage); and collection voltage Vmdc detected by voltage detector 73 exceeds the normal operation range (approximately equal to or greater than 110% of the rated voltage). The lower limit value of the normal operation voltage determined in step S270 corresponds to one example of the "third voltage".

When it is detected that Vgn_ref=0.8 and Vmdc≥1.1 pu (when it is determined as YES in S270), control device 1 adjusts active current command value Iq_ref of AC/DC converter 30 in step S280. Specifically, as indicated by a dotted line in FIG. 5, the detection value of collection voltage Vmdc is input to active current command value adjustment unit 88. Then, the value obtained by multiplying the difference between collection voltage Vmdc and the rated voltage of the collection voltage by a coefficient is subtracted from the active current command value in the normal state (in this case, the maximum value is 1 pu). Thereby, adjusted active current command value Iq_ref can be set.

In step S290, control device 1 causes AC/DC converter 30 to perform feedback control of the active current according to active current command value Iq_ref adjusted in step S280.

While controlling the active current, control device 1 determines in step S300 whether input current ILP1 detected by current detector 113 and input into first DC/DC converter 40 is equal to zero (ILP1=0) or not.

When input current ILP1=0, the electric charge remaining in transformer TR1 of first DC/DC converter 40 flows into collection line 41 (the collection grid), with the result that collection voltage Vmdc may rise. Thus, when it is detected that ILP1=0 (when it is determined as YES in S300), then in step S310, control device 1 sets inverter circuit 112 on the secondary side of first DC/DC converter 40 in a gate block state. In other words, semiconductor switching elements Q15 to Q18 in FIG. 3 are turned off.

Control device 1 keeps the gate block state set in step S310 until it is determined in step S320 that a predetermined constant time period has elapsed (when it is determined as NO in S320). The constant time period in step S320 can be set to fall within a time period satisfying the FRT requirements, for example, approximately in a range of several tens [ms] to several hundreds [ms].

When the gate block state set in step S310 is continued for a constant time period (when it is determined as YES in S320), then in step S330, control device 1 cancels the gate block state of inverter circuit 112 on the secondary side of first DC/DC converter 40, to restart first DC/DC converter 40. After first DC/DC converter 40 is restarted, the normal power transmission operation can be resumed in step S230 by first DC/DC converter 40 controlling generated voltage Vgn (the DC voltage on the primary side) and in step S240 by AC/DC converter 30 controlling the active current input from power generator 20.

In this way, according to the second embodiment, when an AC grid fault occurs and the DC grid voltage rises, the voltage command value (generated voltage command value Vgn_ref) of first DC/DC converter 40 is adjusted as collection voltage Vmdc rises. Accordingly, by the effects of: the voltage control by DC/DC converter 40; and the current limitation by AC/DC converter 30 (active current command value limiter 97), incoming flow of the generated electric power from power generator 20 can be suppressed, and power transmission can be continued.

Furthermore, when power transmission from power conversion system 100 is temporarily stopped, for example, by stopping the converter on the power receiving side (AC distribution grid 70), active current command value Iq_ref of AC/DC converter 30 is adjusted as collection voltage Vmdc rises. Thereby, incoming electric power from power generator 20 is suppressed, with the result that the operation continuity can be improved.

Power conversion system 100 according to the present embodiment has been described with regard to the configuration example in which the electric power generated in wind power generation facility 2 is converted by first DC/DC converter 40 into a DC voltage (generated voltage), which is then collected by second DC/DC converter 50 and raised to transmission voltage Vhdc to implement high-voltage DC transmission (HVDC). In contrast, a modification may have a system configuration in which second DC/DC converter 50 is not interconnected but DC/AC converter 60 collects electric power and transmits the collected electric power to AC distribution grid 70.

In this modification in which DC/DC converter 50 is not disposed, electric power can be collected at the intermediate voltage raised by first DC/DC converter 40 and transmitted by DC/AC converter 60 to an AC grid. In this case, collection voltage Vmdc is controlled by DC/AC converter 60 and the rated value of generated voltage Vgn is set at a voltage higher than that in the system configuration in which DC/DC converter 50 is disposed.

Also in this modification, one pair of AC/DC converter 30 and DC/DC converter 40 control the same target (active current and generated voltage Vgn). Thus, when a DC grid fault and an AC grid fault occur, the control processes described in the first and second embodiments are applied, so that the operation continuity of the power conversion system can be improved.

Furthermore, the present embodiment has been described with regard to the system configuration in which AC/DC converter 30 and DC/DC converter 40 are disposed in each of two power generators 20. However, irrespective of the number of power generators 20, AC/DC converter 30 and DC/DC converter 40 are similarly controlled for each power generator 20. Thereby, the effects described in the first and second embodiments can be achieved. In other words, the power conversion system according to each of the first and second embodiments can also be regarded as including each collection line 41 as a "DC power grid" for controlling AC/DC converter 30 and DC/DC converter 40 that are disposed corresponding to one power generator 20. In other words, the present embodiment is applicable also to a power conversion system including a single power generator 20.

Furthermore, the present embodiment has been described with regard to the example in which power conversion system 100 transmits AC power, which is received from power generator 20 disposed in wind power generation facility 2, through a DC power grid to an AC power grid. However, it is noted for confirmation that the energy source of power generator 20 that supplies AC power is not limited to wind power but may be any source.

It should be understood that the embodiments disclosed herein are illustrative and non-restrictive in every respect. The scope of the present invention is defined by the terms of the claims, rather than the description above, and is intended to include any modifications within the meaning and scope equivalent to the terms of the claims.

REFERENCE SIGNS LIST 1, 1A, 1B control device, 2, 2A, 2B wind power generation facility, 3 protection control device, 10, 10A, 10B windmill, Q1 to Q6, Q11 to Q18 semiconductor switching element, 20, 20A, 20B power generator, 30, 30A, 30B AC/DC power converter, 31, 31A, 31B, NL1, NL2, PL1, PL2 power line (DC), 40, 40A, 40B first DC/DC power converter, 41, 41A, 41B collection line, 45 collection grid, 50 second DC/DC power converter, 51 power transmission line, 60 DC/AC power converter, 61, 61A, 61B, 63, 63A, 63B, 64, 64A, 64B, 65A, 65B, 113, 115 current detector, 67, 71, 71A, 71B, 72, 72A, 72B, 73 voltage detector, 70 AC distribution grid, 81 AC voltage detection unit, 82 AC current detection unit, 83 DC voltage detection unit, 84 DC current detection unit, 85 phase detection unit, 86 dq conversion unit, 87 AC voltage control unit, 88 active current command value adjustment unit, 89 voltage command value adjustment unit, 90 AC current control unit, 91 modulation factor limiter, 92, 95 gate drive control unit, 93 DC voltage control unit, 94 phase limiter, 96 converter protection control unit, 97 active current command value limiter, 100 power conversion system, 111, 112 inverter circuit, 300 current path, C1, C11, C12 smoothing capacitor, CB3B, CB3 A DC circuit breaker, D1, D6 diode element, D1 to D6, D11 to D14 diode, DCL1A, DCL1B, DCL2A, DCL2B, DCL3, DCL4 reactor, IINV converter current, ILN1, ILP1 input current, IMAX current threshold value, Id reactive current command value, Id axis current, Id, Vq axis current, Iq active current, Iq_ref active current command value, LVdc, Vgn generated voltage command value, MFpwm pulse width modulation factor, SPWM gate drive signal, PGθ1 first gate drive pulse signal, PGθ2 second gate drive pulse signal, TR1 insulating transformer, UL1, UV1, UW1 power line (three-phase AC), Vmdc, VmdcA, VmdcB collection voltage, Vgn, VgnA, VgnB generated voltage, Vgn_ref voltage command value (generated voltage), Vhdc transmission voltage.

The invention claimed is:

1. A power conversion system that transmits AC power generated by a power generator through a DC power grid to an AC power grid, the power conversion system comprising:
    an AC/DC power converter to convert the AC power from the power generator into electric power of a first DC voltage, and output the electric power of the first DC voltage;
    a DC/DC power converter to convert the electric power output from the AC/DC power converter into electric power of a second DC voltage, and output the electric power of the second DC voltage to the DC power grid; and
    a control device to control the AC/DC power converter and the DC/DC power converter, wherein
    the control device includes
        a first drive controller to control the AC/DC power converter such that an active current component and a reactive current component of an AC current output from the power generator follow an active current command value and a reactive current command value, respectively, and
        a second drive controller to control the DC/DC power converter such that the first DC voltage follows a DC voltage command value, and
    when a fault occurs in the DC power grid or the AC power grid, the control device decreases at least one of the active current command value and the DC voltage command value in accordance with fluctuations of the second DC voltage, to suppress electric power that flows from the power generator into the AC/DC power converter.

2. The power conversion system according to claim 1, wherein
    the power conversion system collects DC power obtained by converting AC power generated by a plurality of the power generators, and transmits the DC power to the AC power grid,
    the AC/DC power converter, the DC/DC power converter, the first drive controller, and the second drive controller are disposed corresponding to each of the power generators,
    the power conversion system further comprises:
    a first DC line connecting between the AC/DC power converter and the DC/DC power converter; and
    a second DC line connected to the DC/DC power converter,
    the DC power grid is formed of a plurality of the second DC lines connected in parallel,
    the AC/DC power converter controls a plurality of first semiconductor switching elements, each of which is a self-arc-extinguishing type, to be turned on and off to convert the AC power from a corresponding power generator of the power generators into electric power of the first DC voltage, and outputs the electric power of the first DC voltage to the first DC line,
    the DC/DC power converter controls a plurality of second semiconductor switching elements, each of which is a self-arc-extinguishing type, to be turned on and off to convert the electric power of the first DC voltage output to the first DC line into electric power of the second DC voltage, and outputs the electric power of the second DC voltage to the second DC line,
    the control device further includes
        an AC voltage detector to detect a voltage value of an AC voltage output from each of the power generators,
        an AC current detector to detect a current value of the AC current output from each of the power generators,
        a DC voltage detector to detect a voltage value of each of the first DC voltage and the second DC voltage, and
        a DC current detector to detect a value of a current flowing through the first DC line and the second DC line,
    the AC voltage detector, the AC current detector, the DC voltage detector, and the DC current detector are disposed corresponding to each of the power generators,
    the first drive controller includes
        an AC current controller to calculate a first control output based on the AC voltage and the AC current such that the active current component and the reactive current component follow the active current command value and the reactive current command value, respectively, and
        a first gate drive controller to drive the first semiconductor switching elements according to the first control output,
    the second drive controller includes
        a DC voltage controller to calculate a second control output such that the first DC voltage follows the DC voltage command value, and
        a second gate drive controller to drive the second semiconductor switching elements according to the second control output, and
    when a short-circuit fault occurs in the DC power grid or the AC power grid, at least one of the active current command value to the AC current controller and the DC voltage command value provided to the DC voltage controller is decreased in accordance with fluctuations of the first DC voltage or the second DC voltage, to suppress electric power that flows from the corresponding power generator into the AC/DC power converter.

3. The power conversion system according to claim 2, wherein
    the AC/DC power converter includes
        an inverter circuit formed of the first semiconductor switching elements, and
        a smoothing capacitor connected to the first DC line on a DC side of the inverter circuit,
    the control device further includes an active current command value adjuster to, when it is detected that a detection value of the first DC voltage detected by the DC voltage detector is equal to or greater than a first voltage, decrease the active current command value by subtracting an adjustment amount proportional to an increase amount of the first DC voltage with respect to a rated voltage, the first voltage is set in advance to be higher than the rated voltage of the first DC voltage, and the AC current controller controls the active current component of the AC current according to the decreased active current command value, to suppress electric power that flows from the corresponding power generator into the AC/DC power converter.

4. The power conversion system according to claim 3, wherein when the detection value of the first DC voltage detected by the DC voltage detector decreases below a predetermined voltage, and when the current on the second DC line detected by the DC current detector rises above a predetermined upper limit current, the control device detects a short-circuit fault on the second DC line, temporarily stops the DC/DC power converter, and causes the active current command value adjuster to decrease the active current command value while the DC/DC power converter is stopped.

5. The power conversion system according to claim 4, wherein when the short-circuit fault on the second DC line is detected, the control device temporarily stops the DC/DC power converter until a predetermined time period elapses, when the predetermined time period elapses, the control device causes the DC/DC power converter to control the second DC voltage to rise, before the DC/DC power converter is returned to a controlled state according to the second control output from the DC voltage controller, and when the DC/DC power converter controls the second DC voltage to rise, the DC/DC power converter adjusts a duty ratio of the second semiconductor switching elements to be within a range of 0% to 50% and to set a current flowing through the DC/DC power converter to be equal to or less than a rated current.

6. The power conversion system according to claim 2, wherein the DC/DC power converter further includes
an insulating transformer, and
a first smoothing capacitor and a second smoothing capacitor, the second semiconductor switching elements form a first inverter circuit having an AC side connected to a primary side of the insulating transformer, and a second inverter circuit having an AC side connected to a secondary side of the insulating transformer, the first smoothing capacitor is connected to the first DC line on a DC side of the first inverter circuit, and the second smoothing capacitor is connected to the second DC line on a DC side of the second inverter circuit, the control device further includes a voltage command value adjuster to, when it is detected that a detection value of the second DC voltage is equal to or greater than a second voltage, decrease the DC voltage command value by subtracting an adjustment amount proportional to an increase amount of the second DC voltage with respect to a rated voltage, the second voltage is set in advance to be higher than the rated voltage of the second DC voltage, and an upper limit value of the active current command value to the AC current controller is limited by an active current limiter while the DC voltage command value is decreased, to suppress electric power that flows from the corresponding power generator into the AC/DC power converter.

7. The power conversion system according to claim 6, wherein the control device further includes an active current command value adjuster to, when it is detected that the DC voltage command value decreased by the voltage command value adjuster is equal to a third voltage and the detection value of the second DC voltage is equal to or greater than the second voltage, decrease the active current command value in accordance with the increase amount of the second DC voltage with respect to the rated voltage, the third voltage is set in advance to be lower than a rated voltage of the first DC voltage, and the AC current controller controls the active current component of the AC current according to the decreased active current command value, to suppress electric power that flows from the corresponding power generator into the AC/DC power converter.

* * * * *